(12) United States Patent
Hwang et al.

(10) Patent No.: US 8,792,062 B2
(45) Date of Patent: Jul. 29, 2014

(54) TOUCH INTEGRATED DISPLAY DEVICE

(75) Inventors: Sangsoo Hwang, Seoul (KR); Cheolse Kim, Daegu (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/337,401

(22) Filed: Dec. 27, 2011

(65) Prior Publication Data

US 2012/0218482 A1    Aug. 30, 2012

(30) Foreign Application Priority Data

Feb. 25, 2011   (KR) .................. 10-2011-0017176

(51) Int. Cl.
*G02F 1/1335* (2006.01)
*G06F 3/041* (2006.01)

(52) U.S. Cl.
USPC ........................ 349/12; 345/173; 178/18.01

(58) Field of Classification Search
CPC .............. G06F 3/044; G06F 3/0412; G06F 2203/04103; G06F 3/041; G06F 3/0416; G02F 1/13338
USPC .......... 349/12; 345/173–178, 104; 178/18.01, 178/18.03–18.08
See application file for complete search history.

(56) References Cited

U.S. PATENT DOCUMENTS

| | | | |
|---|---|---|---|
| 8,411,064 B2 | 4/2013 | Noguchi et al. | |
| 2008/0062139 A1* | 3/2008 | Hotelling et al. | 345/173 |
| 2009/0122017 A1* | 5/2009 | Emig et al. | 345/173 |
| 2010/0085324 A1 | 4/2010 | Noguchi et al. | |
| 2010/0309157 A1* | 12/2010 | Ye et al. | 345/173 |
| 2010/0328239 A1* | 12/2010 | Harada et al. | 345/173 |
| 2010/0328438 A1* | 12/2010 | Ohyama et al. | 348/51 |

FOREIGN PATENT DOCUMENTS

| | | |
|---|---|---|
| CN | 101339314 A | 1/2009 |
| CN | 101719344 A | 6/2010 |
| CN | 101938666 A | 1/2011 |

OTHER PUBLICATIONS

Extended European Search Report dated Jan. 16, 2013 for corresponding EP Patent application No. 11195509.2.
Office Action dated Feb. 20, 2014, issued by the State Intellectual Property Office of China for Chinese Patent Application No. 201110455312.8.

* cited by examiner

*Primary Examiner* — Michael Caley
*Assistant Examiner* — Jia Pan
(74) *Attorney, Agent, or Firm* — Morgan, Lewis & Bockius LLP

(57) ABSTRACT

The present invention provides a touch integrated display device which reduces a thickness of a display device and can improve touch performance. The touch integrated display device according to one embodiment of the present invention can include: a TFT positioned on a lower substrate; a pixel electrode connected to the TFT; a common electrode facing the pixel electrode to form electric field; a liquid crystal layer positioned on the common electrode; an upper substrate facing the lower substrate which is positioned at both sides of the liquid crystal layer; a driving electrode which is positioned on one side of the upper substrate adjacent to the liquid crystal layer; and a sensing electrode which is positioned on the other side of the upper substrate and faces the driving electrode.

4 Claims, 12 Drawing Sheets

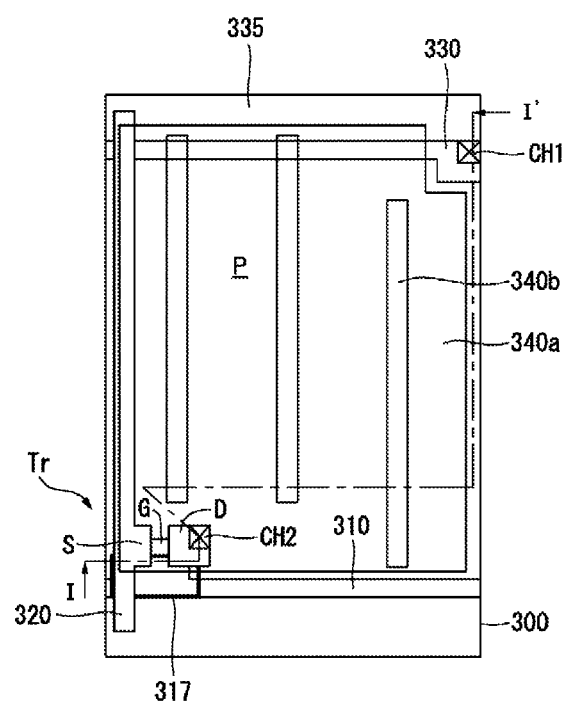

TOUCH INTEGRATED DISPLAY DEVICE

This application claims the benefit of Korean Patent Application No. 10-2011-0017176 filed on Feb. 25, 2011 which is hereby incorporated by reference

BACKGROUND

1. Field

This document relates to a touch display device, and more particularly to a touch integrated display device which can reduce thickness and improve touch performance.

2. Description of the Related Art

Various input devices, such as a keyboard, a mouse, a trackball, a joystick, a digitizer, and the like, are used for an interface between a user and home appliances or various information communication devices. However, in order to use the above input devices, the user should learn how to use the input devices and the quality thereof is not easily improved by causing inconvenience, such as a space necessary for installation thereof. Accordingly, a demand exists for input devices which have convenient and simple functions and can reduce malfunctions. In response, a touch panel has been proposed to enable a user to contact a screen using a hand or a pen to input information.

The touch panel has simple functions, reduces the malfunctions, and enables the user to perform an input without using an additional input device. In addition, the touch panel can be applied to various display devices by enabling the user to perform rapid and easy operations through contents displayed on the screen.

The touch panels can be classified into an add-on type, an on-cell type, and an in-cell type according to structures thereof. The add-on type is a type in which the touch panel is attached on an upper surface of a display device after the display device and the touch panel are separately manufactured. The on-cell type is a type in which elements included in the touch panel are directly formed on a surface of an upper glass substrate of the display device. The in-cell type is a type in which the elements constituting the touch panel are directly formed in the inside of the display device.

However, the add-on type has a structure in which the completed touch panel is mounted on the display device and has the problems, such as increased thickness or reduced visibility due to low brightness of the display device. In addition, the on-cell type touch has a structure in which the touch panel is formed on an upper surface of the display device and can reduce the thickness in comparison with the add-on type but has the problems that the entire thickness is increased by a driving electrode layer, a sensing electrode layer, and an insulation layer for insulating the driving electrode layer and the sensing electrode layer and the increase of the entire thickness and the number of processes causes an increase in manufacturing costs. In addition, the in-cell type can reduce thickness of the display device by forming elements constituting the touch panel in the inside of the display device but has the problem that a driving electrode and a sensing electrode for composing the touch panel cause wirings and parasitic capacitance of the display device and the touch recognition performance is thereby lowered.

Accordingly, a need for display devices rises to solve the problems.

SUMMARY

An aspect of this document is to provide a touch integrated display device which can reduce thickness of a display device and improve touch performance.

The touch integrated display device according to an aspect of the present invention can include a thin film transistor (TFT) positioned on a lower substrate, a pixel electrode connected to the TFT, a common electrode which faces the pixel electrode to form electric field, a liquid crystal layer positioned on the common electrode, an upper substrate facing the lower substrate which is positioned at both sides of the liquid crystal layer, a driving electrode which is positioned on one side of the upper substrate adjacent to the liquid crystal layer, and a sensing electrode which is positioned on the other side of the upper substrate and faces the driving electrode.

The touch integrated display device according to an aspect of the present invention can include a TFT positioned on a lower substrate, a pixel electrode connected to the TFT, a liquid crystal layer positioned on the pixel electrode, an upper substrate facing the lower substrate which is positioned at both sides of the liquid crystal layer, a common electrode positioned on one side of the upper substrate adjacent to the liquid crystal layer, and a sensing electrode positioned on the other side of the upper substrate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2A is a plan view illustrating a lower substrate of a display device according to an embodiment of the present invention and FIG. 2B is a cross sectional view taken along line I-I' of FIG. 2A;

DETAILED DESCRIPTION OF THE EMBODIMENTS

Exemplary embodiments of the present invention will be described in greater detail with reference to the accompanying drawings.

Figure 1:
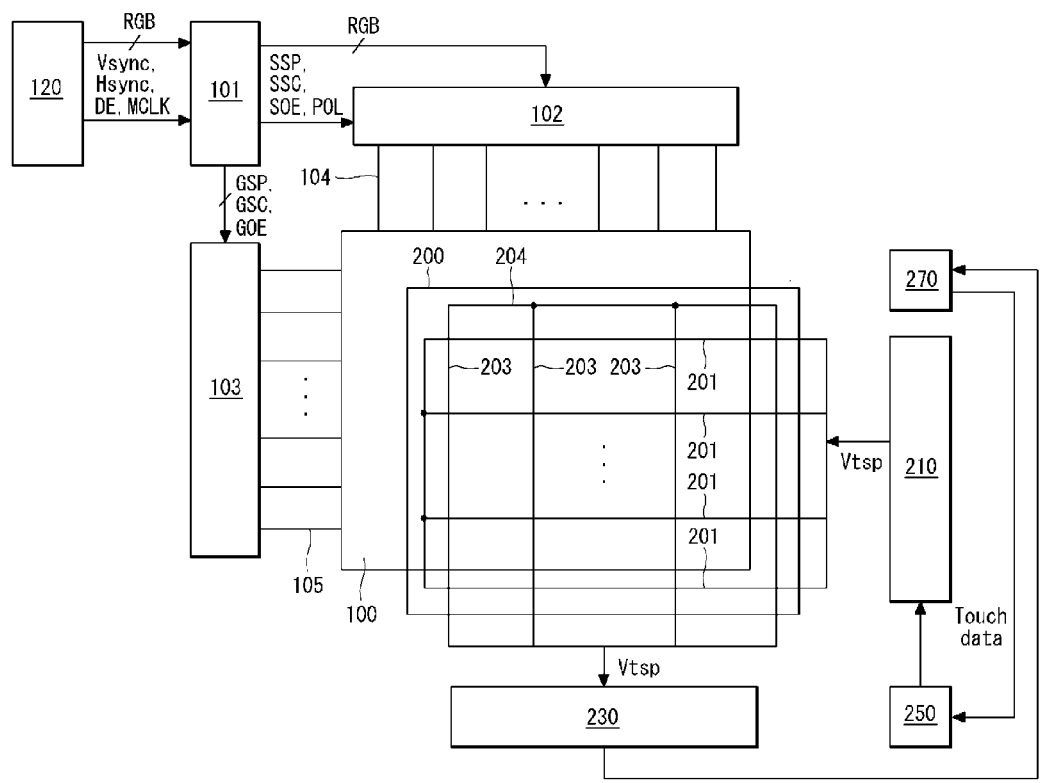
FIG. 1 is a block diagram illustrating a touch integrated display device according to an embodiment of the present invention.

FIG. 1 is a block diagram illustrating a touch integrated display device according to an embodiment of the present invention.

Referring to FIG. 1, a touch integrated display device includes a liquid crystal display panel 100 including an upper substrate having color filters and a lower substrate having a TFT array, a backlight unit, a timing controller 101, a data driver 102, a gate driver 103, a host controller 120, a touch element 200, a driving electrode driver 210, a sensing electrode driver 230, a touch controller 250, and a touch recognition processor 270.

The liquid crystal panel 100 includes a liquid crystal layer and a spacer for maintaining a cell gap of the liquid crystal layer between the upper and lower substrates.

The backlight unit is arranged under the liquid crystal display panel 100. The backlight unit includes a plurality of light sources to uniformly irradiate light to the liquid crystal display panel 100. The backlight unit can include a direct type backlight unit or an edge type backlight unit. The backlight unit can include at least one of light sources, such as a HCFL (Hot Cathode Fluorescent Lamp), a CCFL (Cold Cathode Fluorescent Lamp), an EEFL (External Electrode Fluorescent Lamp), and a LED (Light Emitting Diode).

The data driver 102 samples and latches digital video data RGB under control of the timing controller 101. The data driver 102 inverts a polarity of a data voltage by converting the digital video data RGB to positive/negative gamma compensation voltages GMA1-GMAn. The positive/negative gamma compensation voltages outputted from the data driver 102 are synchronized with a gate pulse outputted from the gate driver 103. Source drive ICs (Integrated Circuits) of the data driver 102 can be respectively connected to data lines 104 of the liquid crystal display panel 100 in a Chip On Glass (COG) process or a Tape Automated Bonding (TAB) process. The source drive ICs are integrated in the timing controller 101 as one chip IC.

The gate driver 103 sequentially outputs gate pulses (or scan pulses) in a display mode under the control of the timing controller 101 and shifts a swing voltage of the output gate pulses to a gate high voltage VGH and a gate low voltage VGL. The gate pulses outputted from the gate driver 103 are synchronized with the data voltage outputted from the data driver and are sequentially supplied to gate lines 105. The gate high voltage VGH is greater than or equal to a threshold voltage of the TFT, and the gate low voltage VGL is lower than the threshold voltage of the TFT. Gate driving ICs of the gate driver 103 are connected to gate lines 105 of the lower substrate of the liquid crystal display panel 100 through a TAB process or can be directly formed on the lower substrate of the liquid crystal display panel 100 together with pixels through a Gate In Panel (GIP) process.

The timing controller 101 generates a data timing control signal for controlling operation timing of the data driver 102 and the polarity of the data voltage by using a timing signal from the host controller 120 and a gate timing control signal for controlling operation timing of the gate driver 103.

The gate timing control signal includes a gate start pulse GSP, a gate shift clock GSC, a gate output enable signal GOE, and the like. The gate start pulse GSP is applied to a first gate driving IC for outputting a first gate pulse at each frame period from the gate driver 103 and controls the shift start timing of the gate driving IC. The gate shift clock GSC is a clock signal which is commonly inputted into the gate driving ICs of the gate driver 103 and shifts the gate start pulse GSP. The gate output enable signal GOE controls the output timing of the gate driving ICs of the gate driver 103.

The data timing control signal includes a source start pulse SSP, a source sampling clock SSC, a polarity control signal POL, and a source output enable signal SOE, and the like. The source start SSP is applied to a first source driving IC for first sampling the data in the data driver 102 and controls the data sampling start timing. The source sampling clock SSC is a clock signal for controlling the sampling timing of the data within the source driving ICs based on a rising or falling edge. The polarity control signal POL controls a polarity of the data voltages outputted from the source driving ICs. The source output enable signal SOE controls the output timing of the source driving ICs. When the digital video data RGB are inputted through a mini Low Voltage Differential Signaling (LVDS) interface to the data driver 102, the source start pulse SSP and the source sampling clock SSC can be omitted.

The host controller 120 transmits digital video data RGB of an input image and timing signals Vsync, Hsync, DE, MCLK necessary for driving the display through interfaces of the LVDS interface, a Transition Minimized Differential Signaling (TMDS) interface, and the like to the timing controller 101. In a display device according to first to fourth embodiments to be described below, the host controller 120 receives touch coordinates from the touch controller and performs an application corresponding to the touch coordinates. In a display device according to a fifth embodiment, the host controller 120 supplies a control signal for controlling a power supply unit (not shown) to supply a common voltage Vcom to a common electrode in a display driving period for displaying an image on a screen of the display device or to supply a touch driving voltage Vtsp to the common electrode in a touch driving period for recognizing a touch.

The touch element 200 includes a plurality of driving electrodes 201 which are arranged in parallel to each other in a first direction (for example, a X-direction), a plurality of sensing electrodes 203 which are arranged in parallel to each other in a second direction (for example, a Y-direction) crossing the first direction, and an upper substrate (not shown) which is positioned between the driving electrodes 201 and the sensing electrodes 203 and prevents an electrical contact between the sensing electrodes 203 and the driving electrodes 201.

The driving electrode driver 210 scans the driving electrodes 201 by sequentially supplying the pulse voltages Vtsp generated from the power supply unit (not shown) to the driving electrodes 201 of the touch element 200. The sensing electrode driver 230 senses the pulse voltage Vtsp and transmits the sensed pulse voltage to the touch recognition processor 270 after finishing the scanning operation for the driving electrodes 201.

The touch recognition processor 270 is connected to the sensing electrodes 203 of the touch element 200, differentially amplifies voltages of initial capacitance and touch capacitance of conductive patterns of the touch element 200, and converts the results to digital data. The touch recognition processor 270 determines a touch position based on a difference between the initial capacitance and the touch capacitance by using a touch recognition algorithm and outputs touch data for indicating the touch position to the touch controller 250.

The touch controller 250 generates a scanning control signal to a driving electrode driver 210 for driving the touch element 200. The touch controller 250 receives the scanning control signal from the timing controller 101 and applies the scanning control signal to the driving electrode driver 210.

Figure 2B:
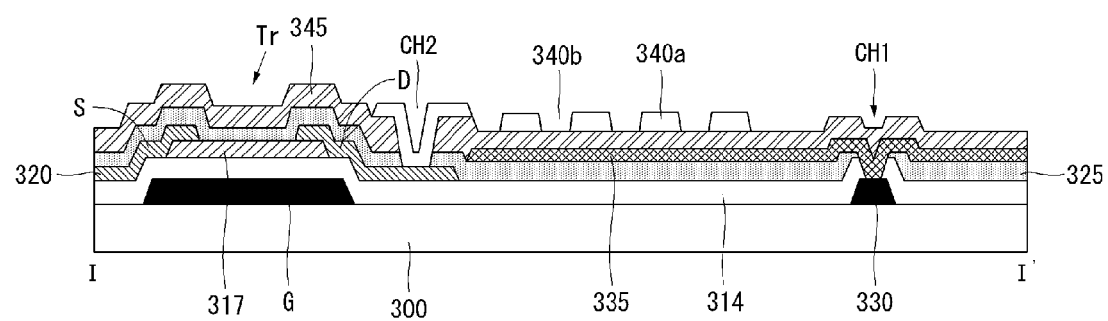

FIG. 2A is a plan view illustrating a lower substrate of a display device according to an embodiment of the present invention, and FIG. 2B is a cross sectional view taken line I-I' of FIG. 2A.

Referring to FIG. 2A, a gate line 310 is extended in one direction on a lower substrate 300, and a data line 320 is positioned across the gate line 310 and defines a sub-pixel P. A common line 330 is arranged in parallel to the gate line 310 and intersects with the data line 320. The sub-pixel P is defined at the intersection among the gate line 310, the data line 320, and the common line 330.

A TFT Tr is positioned at the sub-pixel P and includes a gate electrode G connected to the gate line 310, a gate insulating layer (not shown), a semiconductor layer 317, a source electrode S connected electrically to the data line 320, and a drain electrode D separated from the source electrode S.

A plate type common electrode 335 is positioned at the sub-pixel P, and a bar type pixel electrode 340a having a plurality of openings 340b is positioned and corresponds to the common electrode 335 in the sub-pixel P. The common electrode 335 is electrically connected through a first contact hole CH1 to the common line 330 to receive a voltage. The pixel electrode 340a is electrically connected through a second contact hole CH2 to the drain electrode D.

Referring to FIG. 2B, the gate line (not shown) and the gate electrode G are positioned in one direction on the lower substrate 300 and the common electrode 330 which is arranged in parallel to and is separated from the gate line (not shown) is positioned on the same plane.

A gate insulating layer 314 is positioned on the gate electrode G and the common line 330 and insulates the gate electrode G and the common line 330 from each other. The semiconductor layer 317 is positioned on an area corresponding to the gate electrode G on the gate insulating layer 314. The source electrode S and the drain electrode D are respectively positioned at both ends of the semiconductor layer 317. As a consequence, a TFT Tr including the gate electrode G, the semiconductor layer 317, the source electrode S, and the drain electrode D is formed.

A first protective layer 325 including the TFT is positioned on the lower substrate 300. The common electrode 335 and the common line 330 are electrically connected to each other through the first contact hole CH1 which penetrates the gate insulating layer 314 and the first protective layer 325 to expose the common line 330. The pixel electrode 340a and the drain electrode D are electrically connected to each other through a second contact hole CH2 which penetrates the first protective layer 325 to expose the drain electrode D. A second protective layer 345 is positioned between the pixel electrode 340a and the common electrode 335 to insulate the pixel electrode 340a and the common electrode 335 from each other.

Figure 3A:
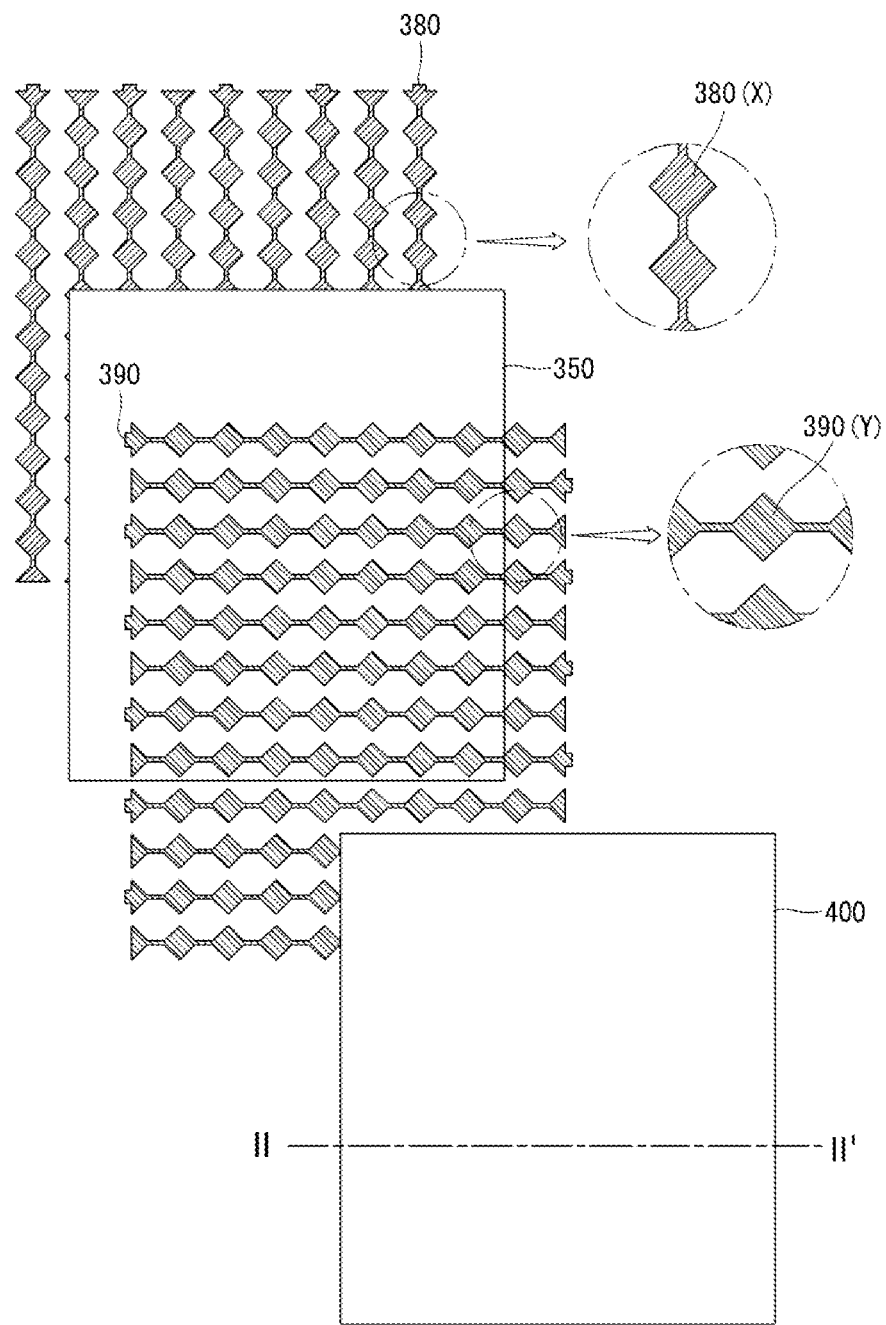
FIG. 3A is a perspective view illustrating an upper substrate of a display device according to an embodiment of the present invention and FIG. 3B is a cross sectional view taken along line II-II' of FIG. 3A.
Figure 3B:
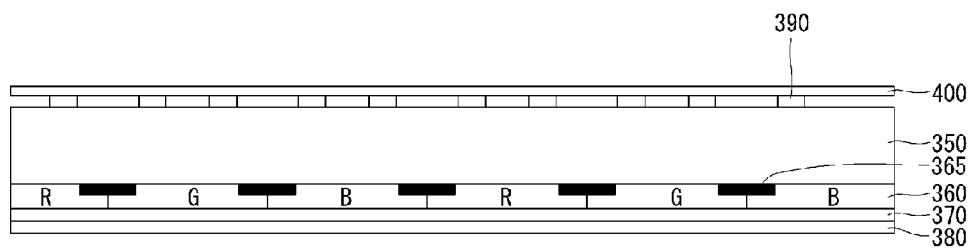

FIG. 3A is a perspective view illustrating an upper substrate according to an embodiment of the present invention, and FIG. 3B is a cross sectional view taken line II-II' of FIG. 3A.

Referring to FIGS. 3A and 3B, a display device according to an embodiment of the present invention includes black matrixes 365 and color filters 360 which are positioned on a lower part of an upper substrate 350, an overcoat layer 370 positioned on the color filters 360, driving electrodes 380 positioned on the overcoat layer 370, sensing electrodes 390 positioned on the upper substrate 350, and an upper polarizer 400 positioned on the sensing electrodes 390.

Specifically, the driving electrodes 380 and the sensing electrodes 390 are positioned at both sides of the upper substrate 350 to form the touch element.

The driving electrodes 380 are formed along a first direction on the lower surface of the upper substrate 350. For example, the driving electrodes 380 can be formed to have a regular pattern, such as a diamond pattern, on the lower surface of the upper substrate 350. As described above, the driving electrodes 380 can include a plurality of X patterns which are formed to connect the driving electrodes 380 positioned in one column having the same X-coordinates with each other. The driving electrodes 380 are not limited to having the diamond shape and can have various shapes, such as combinations of repeated polygons including shapes of a square, a rectangle, a diamond, a pyramid, an inverse pyramid, a sawtooth, and the like.

The sensing electrodes 390 are arranged along a second direction on the upper substrate 350 alternately arranged with the driving electrode 380 while not overlapping the driving electrodes 380. For example, the sensing electrodes 390 and the driving electrodes 380 are formed to have the same diamond pattern. The sensing electrodes 390 can include a plurality of Y patterns which are formed to connect the sensing electrodes 390 positioned in one row having the same Y-coordinates with each other.

The sensing electrodes and the driving electrodes 390 and 380 are formed of a transparent material through which light emitted from the display panel passes. The sensing electrodes and the driving electrodes 390 and 380 are formed of a transparent electrode material, such as Indium Tin Oxide (ITO).

Each of the sensing and driving electrodes 390 and 380 can have a thickness that can be set to be within a range in which a transmittance of light emitted from the display panel is secured and a relatively low surface resistance is obtained. A thickness of the sensing electrodes and the driving electrodes 390 and 380 can be set to be optimized in consideration of the transmittance and the surface resistance.

For example, the sensing electrodes and the driving electrodes 390 and 380 can include an ITO pattern having a thickness of 100-300 Å. The embodiments of the present invention are not limited thereto and the thickness of the sensing and driving electrodes 390 and 380 can be changed in consideration of the transmittance and/or the surface resistance.

As described in FIG. 3B, while components of a touch element as described above are assembled, when a finger of a person or an object contacts an upper part of the upper substrate 350, capacitance of the sensing electrodes and the driving electrodes 390 and 380 is changed at the contact position. The change in the capacitance is converted to an electrical signal by a touch recognition processor so that the contact position is detected and a display device is operated.

Various touch integrated display devices according to embodiments of the present invention are described in detail.

Figure 4:
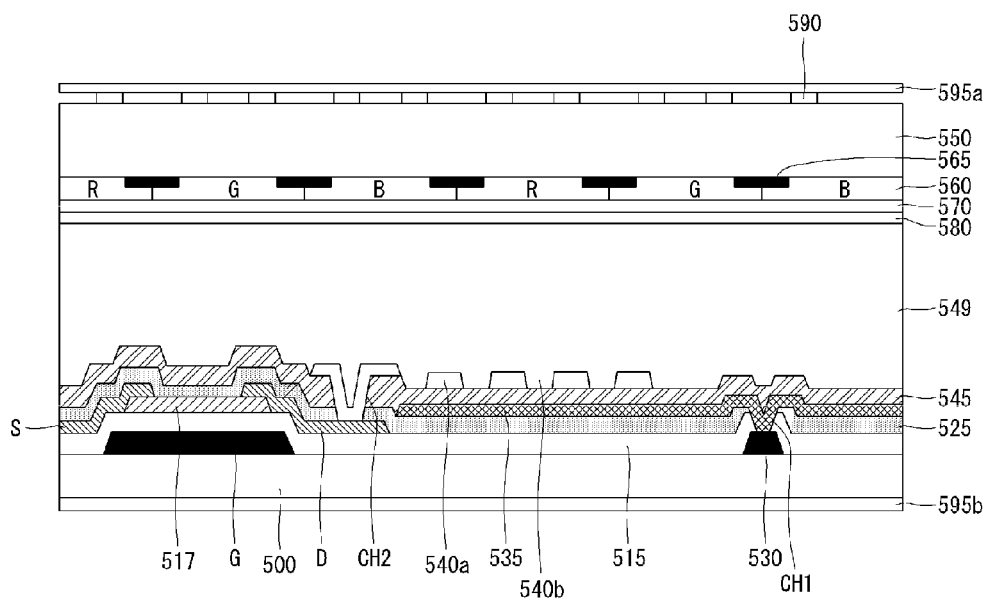
FIG. 4 is a view illustrating a touch integrated display device according to a first embodiment of the present invention.

FIG. 4 is a view illustrating a touch integrated display device according to a first embodiment of the present invention.

Referring to FIG. 4, in the touch integrated display device according to the first embodiment of the present invention, a gate electrode G and a common line 530 are positioned on a lower substrate 500, and a gate insulating layer 515 is positioned to insulate the gate electrode G from the common line 530. A semiconductor layer 517 is positioned on the gate insulating layer 515, and a source electrode S and a drain electrode D are respectively connected to two ends of the semiconductor layer 517. A first protective layer 525 is positioned on the lower substrate 500 including the source electrode S and the drain electrode D. A common electrode 535 is connected to the common line 530 through a first contact hole CH1 which penetrates the first protective layer 525 and the gate insulating layer 515. A second protective layer 545 is positioned on the common electrode 535. A pixel electrode 540a is electrically connected to the drain electrode D through a second contact hole CH2 which penetrates the second protective layer 545 and the first protective layer 525. The pixel electrode 540a includes a plurality of bar type openings 640b.

A liquid crystal layer 549 is positioned on the lower substrate 500, and an upper substrate 550 is positioned on the liquid crystal layer 549. The upper substrate 550 includes a black matrix 565 and a color filter 560 positioned at a lower part of the upper substrate 550, an overcoat layer 570 positioned on the color filter 560, and driving electrodes 580 positioned on the overcoat layer 570. Sensing electrodes 590 are positioned on the upper substrate 550, an upper polarizer 595a is positioned on the sensing electrodes 590, and a lower polarizer 595b is positioned at a lower part of the lower substrate. The sensing electrodes 590 can be obtained by dividing an anti-electrostatic transparent conductive layer included in a conventional display device.

The touch integrated display device includes a touch element which includes the driving electrodes 580 positioned at the lower surface of the upper substrate 550 and the sensing electrodes 590 positioned at the upper surface of the upper substrate 550. The pixel electrode 540a and the common electrode 535 are formed at the lower substrate to drive the display panel.

The liquid crystal layer 549 according to the following embodiments can be driven by an In-Plane Switching (IPS) method or by a Fringe Field Switching (FFS) method. In the following embodiments, the same elements as described in connection with FIG. 4 may be denoted by the same or substantially the same reference numerals.

Figure 5A:
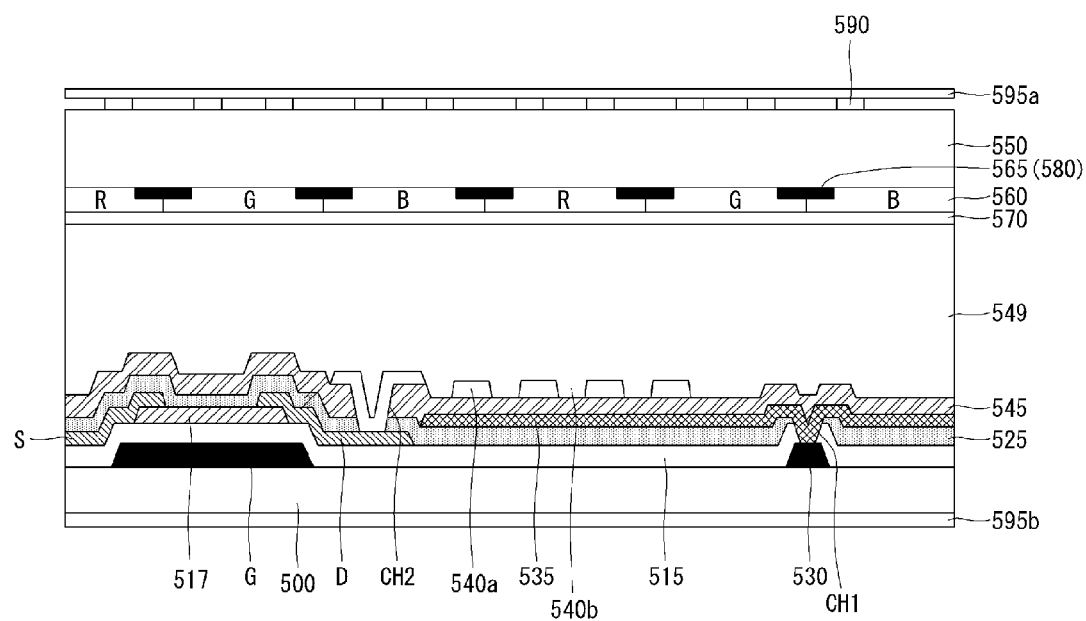
FIGS. 5A and 5B are views illustrating a touch integrated display device according to a second embodiment of the present invention.
Figure 5B:
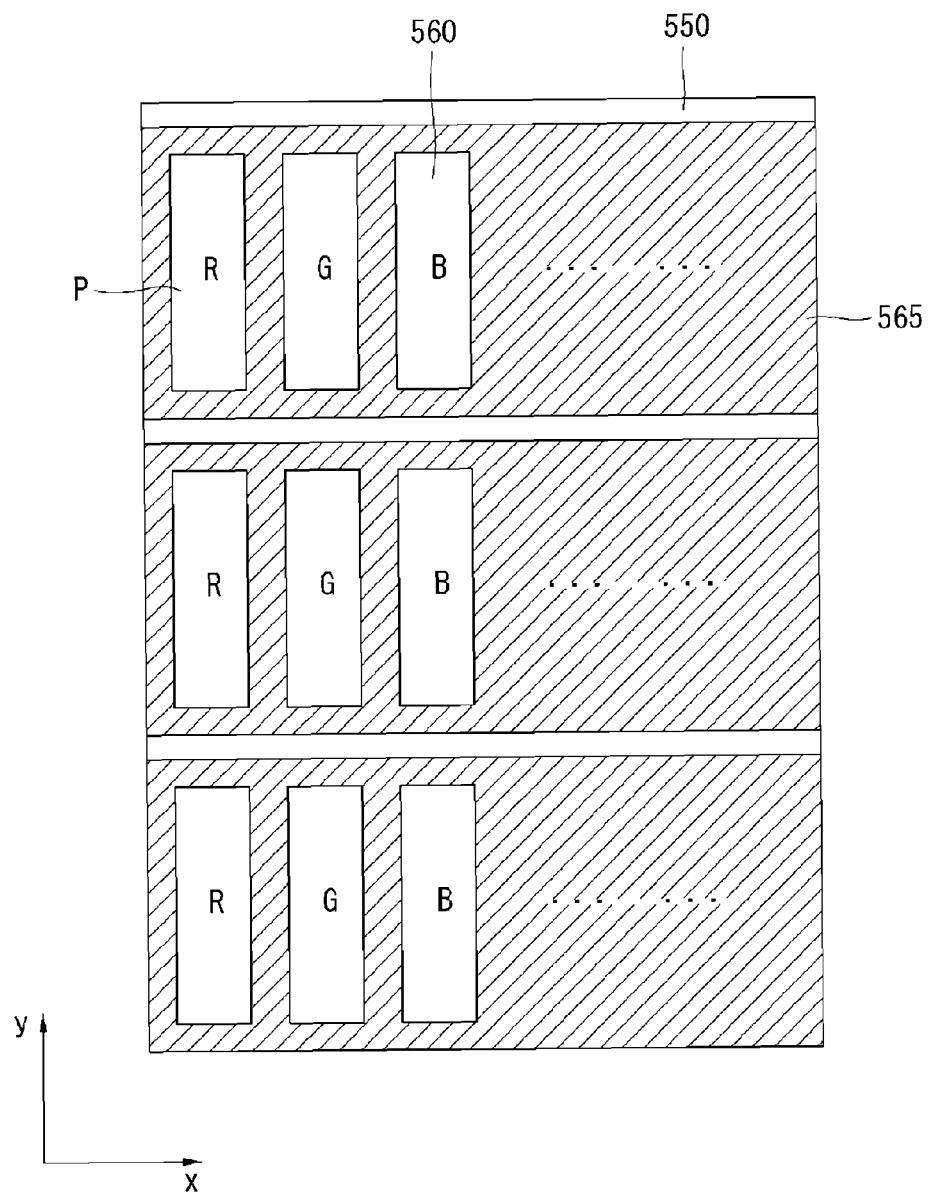

FIGS. 5A and 5B are views illustrating a touch integrated display device according to a second embodiment of the present invention.

Referring to FIGS. 5A and 5B, in the touch integrated display device according to the second embodiment of the present invention, the driving electrodes 580 described in connection with FIG. 4 are not formed, and black matrixes 565 instead plays a role as the driving electrodes 580.

More specifically, referring to FIG. 5B, the black matrixes 565 are arranged in parallel to each other in an X-direction on the upper substrate 550 and R, G, and B, and color filters 560 are respectively positioned at sub-pixel regions. The black matrixes 565 are divided along a direction perpendicular to a longitudinal direction of the sub-pixel P, that is, a y-direction. For example, the black matrixes 565 are divided in a direction intersecting the sensing electrodes and include a metal material so that the black matrixes 565 play a role as the driving electrodes.

As such, in the touch integrated display device according to the second embodiment of the present invention, the black matrixes 565 are divided and include a metal material so that the black matrixes 565 can play a role as the driving electrodes of the touch element.

Figure 6:
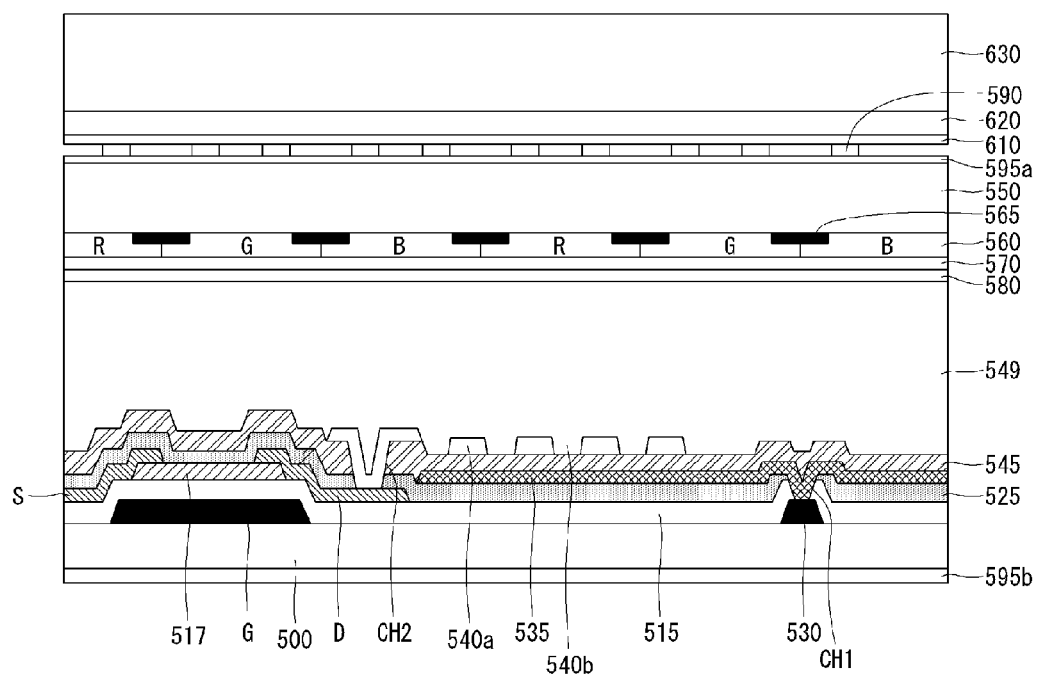
FIG. 6 is a view illustrating a touch integrated display device according to a third embodiment of the present invention.
Figure 7:
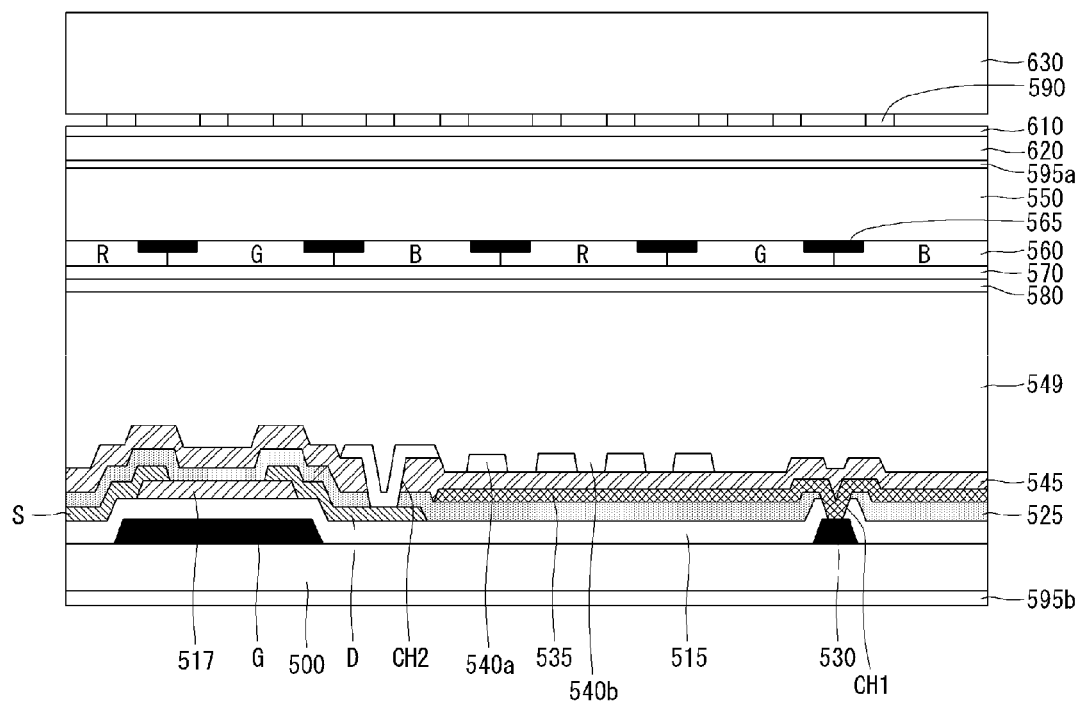
FIG. 7 is a view illustrating a touch integrated display device according to a fourth embodiment of the present invention.

FIG. 6 is a view illustrating a touch integrated display device according to a third embodiment of the present invention, and FIG. 7 is a view illustrating a touch integrated display device according to a fourth embodiment of the present invention.

Referring to FIG. 6, the touch integrated display device according to the third embodiment of the present invention includes the upper polarizer 595a attached on the upper surface of the upper substrate 550, an electrode film 610 positioned on the sensing electrodes 590, an adhesive 620 positioned on the electrode film 610, and a reinforcing glass plate 630 attached to the electrode film 610 through the adhesive 620.

According to an embodiment, the sensing electrodes 590 are formed on the electrode film 610. The electrode film 610 is attached on the upper substrate to which the upper polarizer 595a is attached. The adhesive 620 is formed on the upper substrate 550 to which the electrode film 610 is attached, and the reinforcing glass plate 630 is attached on the adhesive 620.

Referring to FIG. 7, in the touch integrated display device according to the fourth embodiment, the sensing electrodes 590 are formed on the electrode film 610, and the electrode film 610 is attached on the reinforcing glass plate 630. The adhesive 620 is formed on the upper substrate 550 to which the upper polarizer 595a is formed and the reinforcing glass plate 630 is attached on the adhesive 620.

Next, operations of the touch integrated display devices according to the first to fourth embodiments are described. Hereinafter, 60 Hz time division driving is described as an example.

Figure 8:
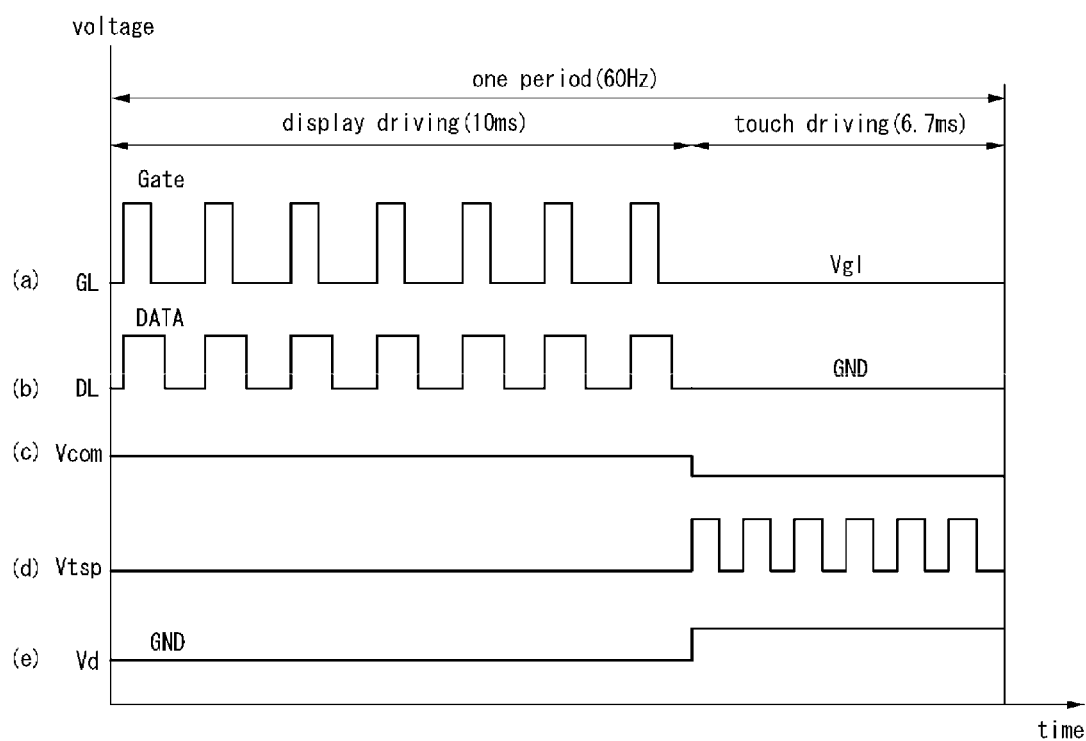
FIG. 8 is a timing view of a touch integrated display device according to an embodiment of the present invention.

FIG. 8 is a timing view of a touch integrated display device according to an embodiment of the present invention.

Referring to FIG. 8, a touch integrated display device according to an embodiment of the present invention is driven by a time division drive method. In the time division drive method, as described in FIG. 8, one period includes a display drive period and a touch drive period. Touch driving is in an off state during the display period, and display driving is in an off state during the touch period to minimize signal interference between the touch driving and display driving. For example, one period is 16.7 ms in the 60 Hz time division driving and is divided into a display period (about 10 ms) and a touch period (about 6.7 ms).

In the display period, the host controller 120, for example, supplies the common voltage Vcom through the gate line 103 to the common electrode. The data driver 102 is synchronized with a gate pulse Gate outputted from the gate driver 103 and supplies a pixel voltage Data corresponding to the digital video data through the data line 104 to the pixel electrode. As the electric field is formed in the liquid crystal layer by the common electrode Vcom and the pixel voltage Data applied to the pixel electrode and the common electrode, respectively, a state of the liquid crystal is changed thus performing a display operation. The touch recognition processor 270 connected to the sensing electrodes 203 of the touch elements measures and stores the voltage value of the initial capacitance of each of the driving electrodes 201 and the sensing electrodes 203.

Next, in the touch drive period, the host controller 120, for example, supplies the touch driving voltage Vtsp to the driving electrodes 201 of the touch element. The touch recognition processor 270 connected to the sensing electrodes 203 differentially amplifies the stored voltage value of the initial capacitance of each of the driving electrodes 201 and the sensing electrodes 203 and the voltage Vd of the capacitance measured in the touch drive period and converts the result to the digital data. A touch recognition processor 107 determines the touch position based on the difference between the initial capacitance and the touch capacitance by using a touch recognition algorithm and outputs touch coordinates data for indicating the touch position.

The touch integrated display device is driven by the time division drive method in which the touch driving is in the off state and the touch drive voltage Vtsp is not supplied during the display period and the display driving is in the off state and the common voltage Vcom is not supplied during the touch drive period.

As described above, the touch integrated display devices according to the first to fourth embodiments of the present invention reduce thickness, improve visibility, and prevent generation of the parasitic capacitance by forming a touch element in the touch integrated display devices.

Figure 9:
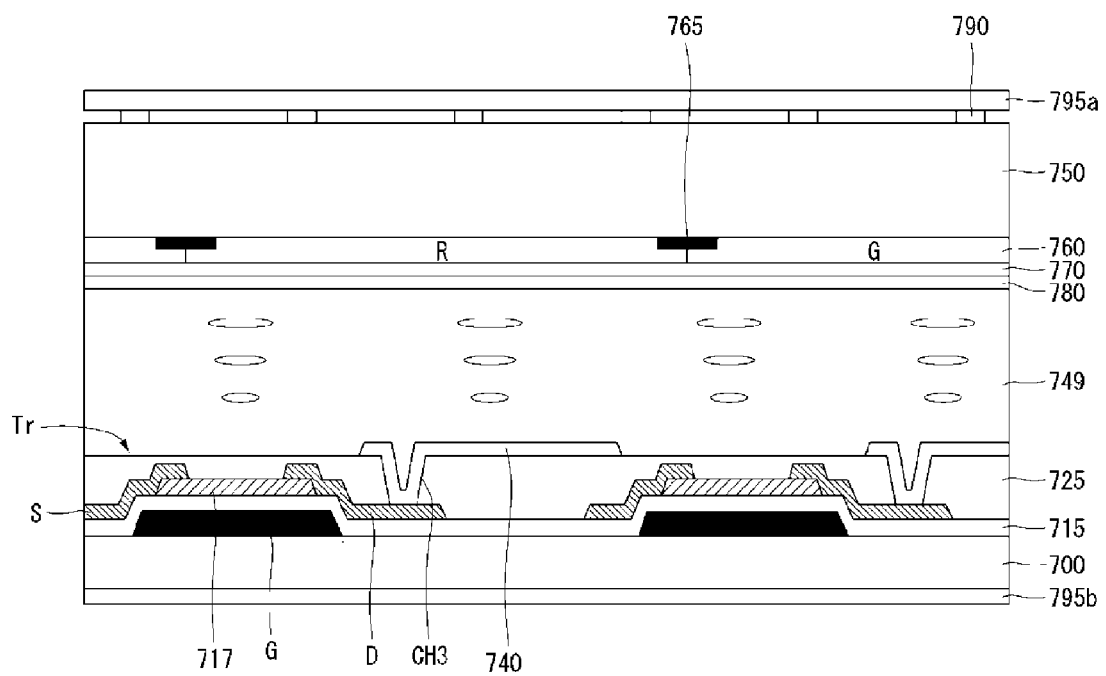
FIG. 9 is a view illustrating a touch integrated display device according to a fifth embodiment of the present invention.

FIG. 9 is a view illustrating a touch integrated display device according to a fifth embodiment of the present invention.

Figure 10:
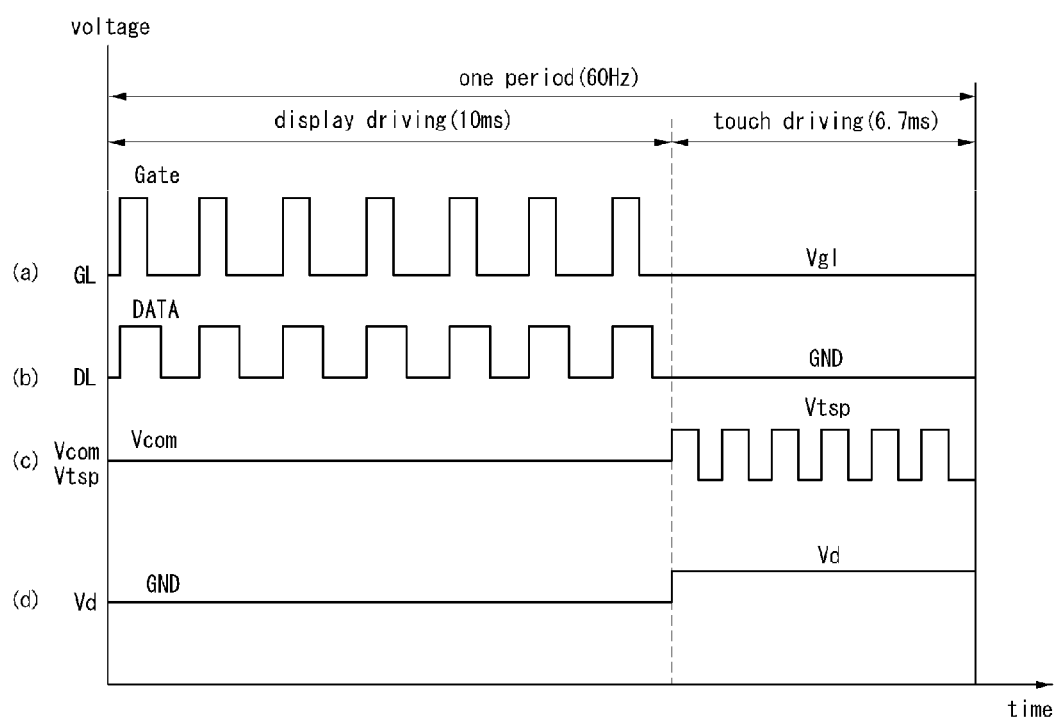
FIG. 10 is a timing view illustrating the touch integrated display device according to the fifth embodiment of the present invention.

FIG. 10 is a timing view illustrating the touch integrated display device according to the fifth embodiment of the present invention.

Referring to FIG. 9, in the touch integrated display device according to the fifth embodiment of the present invention, a gate line (not shown) and a gate electrode G are arranged in one direction on a lower substrate 700. A gate insulating layer 715 is positioned on the gate electrode G for insulation of the gate electrode G, and a semiconductor layer 717 is positioned on a region corresponding to the gate electrode G on the gate insulating layer 715. A source electrode S and a drain electrode D are positioned at two ends of the semiconductor layer 717. Accordingly, a TFT Tr including the gate electrode G, the semiconductor layer 317, the source electrode S, and the drain electrode D is formed.

A protective layer 725 is positioned on the lower substrate 700 including the TFT Tr. A pixel electrode 740 and the drain electrode D are electrically connected through a third contact hole CH3 which penetrates the protective layer 725 and exposes the drain electrode D. A liquid crystal layer 749 is positioned on the lower substrate 700. The liquid crystal layer 749 of the present embodiment can be driven by a driving method, such as a Twisted Nematic (TN) method or a Vertical Alignment (VA) method.

An upper substrate 750 is positioned on the liquid crystal layer 749. The upper substrate 750 includes black matrixes 765 and a color filter 760 positioned at a lower part of the upper substrate 750, an overcoat layer 770 positioned on the color filter 760, and a common electrode 780 positioned on the overcoat layer 770. Sensing electrodes 790 are positioned on the upper substrate 750, an upper polarizer 795a is positioned on the sensing electrodes 790, and a lower polarizer 795b is positioned at a lower part of the lower substrate.

In a touch integrated display device according to an embodiment, the touch element is formed by forming the common electrode 780 at a lower surface of the upper substrate 750 and forming the sensing electrodes 790 on an upper surface of the upper substrate 750. In the lower substrate 700, the display panel is driven by the pixel electrode 740 and the common electrode 780 of the pixel electrode 740. The common electrode 780 formed at the upper substrate 750 plays a role as the driving electrodes of the touch element together with the sensing electrodes 790. The common electrode 780 drives the liquid crystal layer 749 together with pixel electrode 740 formed at the lower substrate 700. The common electrode 780 intersects the sensing electrodes 790 and is divided into a plurality of electrodes to play a role as the driving electrodes of the touch element.

Referring to FIG. 10, the touch integrated display device according to the fifth embodiment of the present invention is driven by the time division drive method. One period in the time division driving, as illustrated in FIG. 10, includes a display period and a touch period. The touch driving is in an off state during a display period, and the display driving is an off state during a touch period. For example, one period is 16.7 ms in the 60 Hz time division driving and is divided into a display period (about 10 ms) and a touch period (about 6.7 ms).

In the display period, the host controller, for example, supplies the common voltage Vcom through the gate line to the common electrode 780 formed with the driving electrodes of the touch element. The data driver is synchronized with a gate pulse Gate outputted from the gate driver and supplies the pixel voltage Data corresponding to the digital video data through the data line to the pixel electrode 740. As the electric field is formed in the liquid crystal layer by the common electrode Vcom and the pixel voltage Data applied to the pixel electrode 740 and the common electrode 780, respectively, a state of the liquid crystal is changed thus performing a display operation. The touch recognition processor connected to the sensing electrodes 790 of the touch elements measures and stores the voltage value of the initial capacitance of each of the common electrodes 780 and the sensing electrodes 790.

Next, in the touch drive period, the host controller, for example, supplies the touch driving voltage Vtsp to the common electrodes 780. The touch recognition processor connected to the sensing electrodes 790 differentially amplifies the stored voltage value of the initial capacitance of each of the common electrodes 780 and the sensing electrodes 790 and the voltage Vd of the capacitance measured in the touch drive period and converts the result to the digital data. The touch recognition processor determines the touch position based on the difference between the initial capacitance and the touch capacitance by using the touch recognition algorithm and outputs the touch coordinates data for indicating the touch position.

In the touch integrated display device, the touch driving is in the off state and the common voltage Vcom is supplied and the touch driving voltage Vtsp is not supplied during the display period. The display driving is in the off state and the common voltage Vcom is not supplied to the common electrode and the touch driving voltage Vtsp is supplied to the common electrode during the touch drive period.

The touch integrated display device according to the fifth embodiment of the present invention may reduce thickness, improve visibility, and prevent generation of the parasitic capacitance by sharing the common electrode for driving the liquid crystal display panel and the common electrode for driving the touch element.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A touch integrated display device, comprising:
    a TFT on a lower substrate;
    a pixel electrode connected to the TFT;
    a common electrode facing the pixel electrode and configured to form an electric field;
    a liquid crystal layer on the common electrode;
    an upper substrate facing the lower substrate, with the liquid crystal layer therebetween; and a driving electrode on a first side of the upper substrate directly contacting the liquid crystal layer on an opposite side of the liquid crystal layer from the common electrode, wherein an upper polarizer, a sensing electrode, an electrode film, an adhesive, and a reinforcing glass plate are sequentially stacked on a second side of the upper substrate, the second side of the upper substrate being opposite to the first side of the upper substrate wherein the color filters are disposed between the driving electrode and the upper substrate, and wherein the common electrode is disposed on the lower substrate under the liquid crystal layer.

2. The touch integrated display device of claim 1, wherein: the upper substrate includes a black matrix.

3. The touch integrated display device of claim 1, wherein a lower polarizer is positioned at a lower surface of the lower substrate.

4. The touch integrated display device of claim 1, wherein a driving method of the liquid crystal layer is an IPS method or a FFS method.

* * * * *